United States Patent [19]

Bachman et al.

[11] 4,363,647

[45] Dec. 14, 1982

[54] METHOD OF MAKING FUSED SILICA-CONTAINING MATERIAL

[75] Inventors: David L. Bachman, Lindley; William C. Lewis, Jr., Big Flats; Peter C. Schultz; Francis W. Voorhees, both of Painted Post, all of N.Y.

[73] Assignee: Corning Glass Works, Corning, N.Y.

[21] Appl. No.: 263,418

[22] Filed: May 14, 1981

[51] Int. Cl.$^3$ .................... C03B 19/06; C03B 20/00
[52] U.S. Cl. ................................ 65/18.2; 65/60.8
[58] Field of Search ............... 65/18.2, 3.12, 60.53, 65/60.8

[56] References Cited

U.S. PATENT DOCUMENTS

| | | | |
|---|---|---|---|
| 2,272,342 | 2/1942 | Hyde | 65/18.2 X |
| 3,620,702 | 11/1971 | DeKalb et al. | 65/18.2 |
| 4,042,404 | 8/1977 | Schultz | 65/18.2 X |
| 4,045,198 | 8/1977 | Rau et al. | 65/3.12 X |
| 4,230,472 | 10/1980 | Schultz | 65/18.2 X |

FOREIGN PATENT DOCUMENTS 53-90026  2/1979  Japan ................ 65/18.2

OTHER PUBLICATIONS

Savelev et al., "Strengthening Vitreous Silica", translated from Steklo: Keramika, No. 10, Oct. 1975, pp. 11–13.

Primary Examiner—Richard V. Fisher
Attorney, Agent, or Firm—Clinton S. Janes, Jr.

[57] ABSTRACT

This invention is directed to the production of fused silica-containing glass articles of large cross section or diameter wherein at least a surface layer thereof exhibits very high optical quality. The method involves depositing via flame hydrolysis/oxidation reaction a layer of fused silica-containing soot onto a supporting bait, essentially immediately thereafter applying a source of heat concentrated uniformly across the breadth of the soot deposit, but focused only over a relatively small area thereof, to raise the temperature within that area sufficiently to uniformly consolidate the soot in that area into a non-porous glass, and then cooling the glass to room temperature.

10 Claims, 5 Drawing Figures

METHOD OF MAKING FUSED SILICA-CONTAINING MATERIAL

BACKGROUND OF THE INVENTION

Several processes have been devised to produce articles of fused silica-containing materials utilizing the basic flame hydrolysis/oxidation reactions disclosed in U.S. Pat. No. 2,272,342. Two of those methods which have seen extensive commercial use have been denoted the hot forming and soot preform processes, respectively.

The hot forming process has been employed in the fabrication of very large masses of fused silica, e.g., mirrors for reflecting telescopes. In conducting that process, the silica soot is deposited over a large area rotating bait or mandrel and consolidated directly into non-porous glass utilizing multiple burners. It will be appreciated that considerable flame heating is required to offset the heat loss in such a large furnace.

Two major thermal fluctuations or gradients appear when doing this with multiple burners, and each adversely affects optical quality by causing refractive index alterations because of non-annealable glass structure inhomogeneities. One of those fluctuations results from the boule surface passing in and out of the deposition flames giving rise to hot spots. This phenomenon promotes a laminar structure or striae in the boule which has the concomitant effect of restricting the use of such glass articles to single-direction optics applications. The second fluctuation or thermal gradient, running from center-to-edge of the boule, is caused by furnace geometry. This non-uniformity has been well-nigh impossible to eliminate by burner placement, particularly adjacent to the boule center, and leads to non-annealable stress birefringence rings (often called Schlieren rings), thereby rendering the glass unacceptable for high grade optics.

Another major problem seemingly inherent in the use of the hot forming process for the production of large masses of fused silica is the formation of inclusions (platelets, seeds, blisters, etc.) which generally result from refractory dust, grit, etc. falling from the furnace environment onto the boule during manufacture. Such contamination appears to be an intrinsic byproduct of the hot forming process when refractory furnaces with large diameter crowns are involved.

Yet another problem encountered in the hot forming process is the growth, during the deposition step, of nodules (called "elks teeth") at the boule perimeter. The nodule formation occurs in any area of deposition where the temperature of glass deposition is too low for adequate glass flow, which is notably at the boule edges. This situation cannot readily be remedied without disrupting other critical parts of the deposition process. Thus, e.g., the whole furnace would be operating at too high a temperature.

In the soot preform process, a porous soot body (preform) is first prepared by flame hydrolysis on a bait or mandrel. The preform is then zone sintered in a furnace utilizing a helium atmosphere.

Exceptionally high optical quality fused silica can be obtained by this method. The process takes advantage of the highly reactive nature of the porous, high surface area, soot preform. The tendency to form layered striae is essentially eliminated. The process has been employed extensively in making glass articles of small bulk, but where high optical quality is demanded, e.g., optical waveguides.

The present invention is designed to produce fused silica-containing articles of large area, i.e., large cross section or diameter, which exhibit very high optical qualities. In addition, the invention provides means for forming laminated articles in large areal bulk wherein at least one lamina consists of fused silica-containing material of very high optical quality.

SUMMARY OF THE INVENTION

The inventive method comprises two fundamental operations which are undertaken sequentially, but in very close succession. In the most general terms, the invention contemplates depositing via flame hydrolysis/oxidation a layer of fused silica-containing soot onto a supporting bait or mandrel and thereafter applying a source of heat uniformly thereto across the breadth of the deposit to raise the temperature sufficiently to consolidate the soot into a solid glass article. Since the heat source utilized for consolidating the porous soot deposit is concentrated across a specific area of the deposit, rather than keeping the entire boule surface hot, a refractory enclosure is unnecessary and, hence, the inclusions due to refractory dust and grit experienced during the hot forming process are eliminated. In fact, if desired, clean air systems can be utilized to further minimize the occurrence of such particulate inclusions. And, inasmuch as the heat source can be designed to focus sufficient heat even to the edges of the boule, uniform consolidation of the deposit can be had over the entire area thereof, thereby eliminating nodule or "elks teeth" formation. Finally, because the entire area of the glass is exposed to the same thermal gradient, the development of refractive index and stress inhomogeneities is inhibited.

Where desired, a composite article can be fabricated wherein layers of glasses of differing silica-containing compositions can be prepared utilizing the basic two-step method described above. Hence, each layer would involve depositing, via flame hydrolysis/oxidation, a silica-containing soot and, essentially immediately thereafter, consolidating the porous deposit by means of a heat source directed specifically, but uniformly thereacross, the soot deposit previously laid down.

One practical application of this latter embodiment of the invention is the ability to strengthen articles prepared from extremely pure fused silica. Thus, a fused silica article can be coated with a thin layer of $TiO_2$-$SiO_2$ glass which exhibits a lower coefficient of thermal expansion than the fused silica. Thereafter, when the composite article is cooled from the annealing range, the surface layers of $TiO_2$-$SiO_2$ glass are put into compression.

Another very practical application of this latter embodiment of the invention is in the field of reflecting mirrors where surface quality is of greatest importance. The inventive method provides the capability for forming a high quality reflective surface layer on a substrate of less than optical quality. For example, an article of fused silica of less than optical quality can be coated with a thin layer of fused silica or $TiO_2$-$SiO_2$ glass of optical quality disposed in accordance with the inventive method. Upon polishing, that layer will exhibit a reflective surface of very high character.

PRIOR ART

U.S. Pat. No. 2,239,551 discloses the general method of preparing glass bodies by thermally decomposing a gaseous mixture of glass-forming compounds in a flame of combustible gas and subsequently consolidating (vitrifying) the resultant mixture of deposited oxides. The thrust of the invention was the production of seals for the lead-in wires used in quartz glass lamps. The patent recites a number of thermally decomposable compounds useful as starting materials including methyl silicate, methyl borate, aluminum chloride, silicon tetrachloride, and boron fluoride. The patent also observes that alkali metal oxides and second group oxides of the Periodic Table may be introduced into the glass product by employing thermally decomposable compounds, noting specifically the use of organometallic compounds for that purpose. The vitrification of the deposited oxide particles is carried out by either using the depositing flame itself at a sufficiently high temperature or by subsequently heating the whole deposit of oxide particles as a single unit.

Because the patent was concerned with very small deposits of silica-containing materials, there could be no awareness of the problems encountered in the production of large masses of fused silica-containing glasses. Moreover, there was not even a suggestion of consolidating the deposited oxides through the use of a source of heat uniformly concentrated across the breadth of the deposit, but focussed only over a relatively small area thereof.

U.S. Pat. No. 2,326,059 also describes the general method of producing glass articles by thermally decomposing a gaseous mixture of glass-forming compounds in a flow of combustible gas and thereafter consolidating (vitrifying) the resultant mixture of deposited oxides. The compositions were limited to products containing 5–11% $TiO_2$ and 89–95% $SiO_2$ with the optional inclusion of $Al_2O_3$ and/or $ZrO_2$. The three-step method disclosed consisting of depositing an amorphous deposit or preform of $TiO_2$-$SiO_2$ particles on a support, removing the preform from the support, and consolidating the preform in a furnace.

There is no description of consolidating the soot deposit by applying a source of heat essentially immediately after the soot has been deposited, the source of heat being uniformly focussed across the breadth of the soot deposit, but only over a relatively small area thereof.

U.S. Pat. No. 4,043,404 is concerned with preparing fused $SiO_2$-$P_2O_5$ glass articles (particularly fiber optic elements) utilizing a variation upon the conventional flame hydrolysis/oxidation techniques. Thus, amorphous soot particles of $SiO_2$-$P_2O_5$ were deposited upon a support at a temperature below that suitable for consolidation thereof to form a porous preform. The preform was subsequently heated to a temperature within an explicitly-defined range to effect consolidation. The patent specifically refers to achieving consolidation by introducing the preform into an electric furnace operating at the proper temperature.

The patent has no suggestion of consolidating the soot deposit by using a heat source narrowly concentrated across the entire width of the soot deposit.

U.S. Pat. No. 4,045,198 is directed to the production of fiber optic materials demonstrating a gradient in refractive index. These products were formed by depositing a succession of layers of doped and undoped fused silica, utilizing conventional flame hydrolysis/oxidation technology, each layer being fired to consolidation prior to the deposition of the subsequent layer. An integral body was built up through the sequential depositions and vitrifications.

There is no disclosure of consolidating the soot deposit by means of a heat source narrowly and uniformly concentrated across the breadth of the deposit which is applied essentially immediately after the deposit has been laid down.

"Strengthening Vitreous Silica," V. N. Savel'ev, L. Z. Finkel'shtein, I. V. Dreval', and G. V. Tigoneu, *Steklo i Keramika*, 10, pp. 11–13, October, 1975 discloses cladding vitreous silica articles with vitreous silica doped with 6–8% $TiO_2$. The doped vitreous silica is observed to have a lower coefficient of thermal expansion than the vitreous silica substrate such that the mechanical strength of the composite article is greater than that of the vitreous silica alone. No information is provided, however, regarding the method of manufacture of the vitreous silica substrate or the cladding layer.

GENERAL DESCRIPTION OF THE INVENTION

Figure 1:
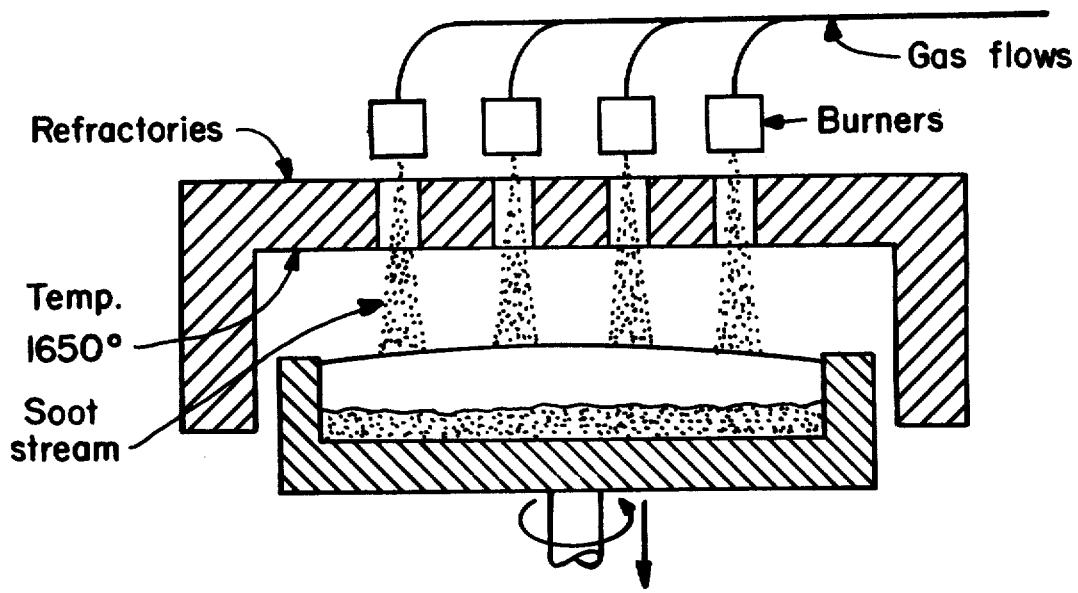
FIG. 1 is a schematic diagram of a prior art apparatus used in the hot forming process for producing fused silica-containing bodies of large bulk.

FIG. 1 depicts schematically the apparatus employed in the prior art hot forming process for producing fused silica-containing bodies of large bulk. Basically, the process consists of multiple burners producing and directing high purity fused silica soot and heat downwardly through a refractory furnace crown where it is immediately deposited and consolidated upon a hot rotating bait or mandrel. When soot is deposited over a large area rotating bait and consolidated directly into bulk glass using multiple burners, substantial flame heating is demanded to overcome the heat loss in such a large furnace. Thus, the refractories will see temperatures in the neighborhood of 1650° C. and even higher. As was explained above, two major thermal fluctuations or gradients result when heating of the furnace is carried out with multiple burners. Each affects optical quality by causing refractive index gradients via non-annealable glass structure modifications.

Figure 2:
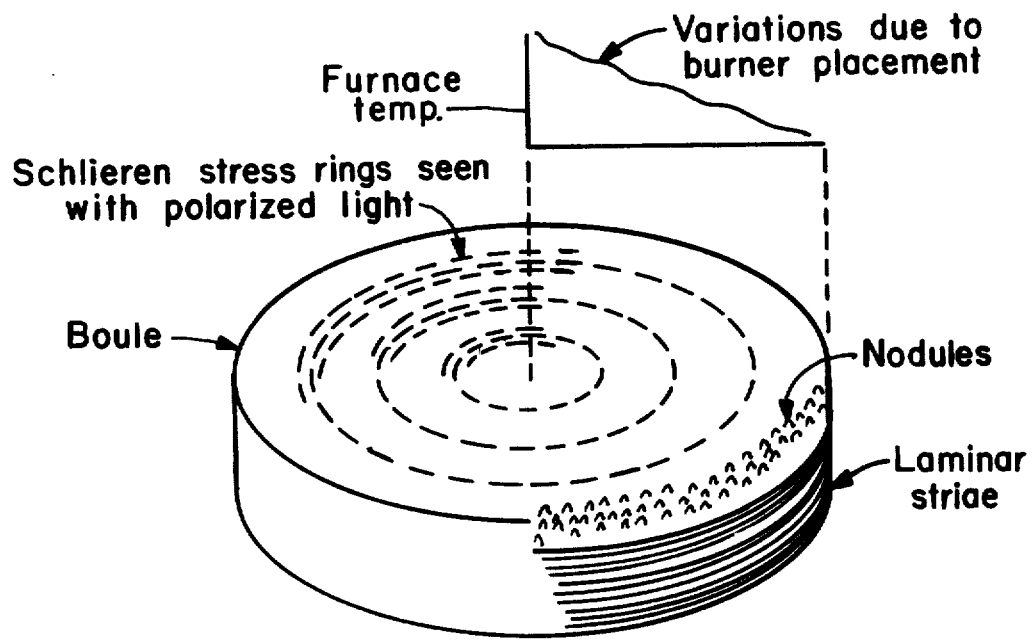
FIG. 2 is a schematic representation of the defects inherently present in fused silica-containing bodies of large bulk produced through use of prior art apparatuses and methods.

One of these fluctuations is the development of hot spots resulting from the boule surface passing in and out of the deposition flames. This circumstance causes a laminar structure, or striae, in the boule (see FIG. 2) which limits the use of the glass article to one-direction optics.

The second thermal fluctuation, running from the center to the edge of the boule, is a result of furnace geometry. Thus, it is virtually impossible to eliminate this thermal gradient by burner placement, particularly near the center of the boule, and leads to non-annealable stress birefrigence rings (Schlieren rings in FIG. 2), making the glass unsatisfactory for high grade optics.

Other defects found in boules produced through the hot forming process include seeds, stones, blisters, etc. which customarily result from refractory dust, grit, and crown drip falling onto the boule during manufacture. Also, nodules can be produced during deposition, particularly at the boule perimeter, whenever the temperature of deposition is too low for adequate glass flow.

In summary, then, to achieve high optical quality fused silica-containing materials of substantial bulk, thermal gradients across the area of the boule must be eliminated or, at the very least, stringently minimized. Contamination from refractories must be suppressed. The temperature of deposition/consolidation must be sufficiently high to insure adequate glass flow to thereby prevent the growth of nodules.

Figure 3:
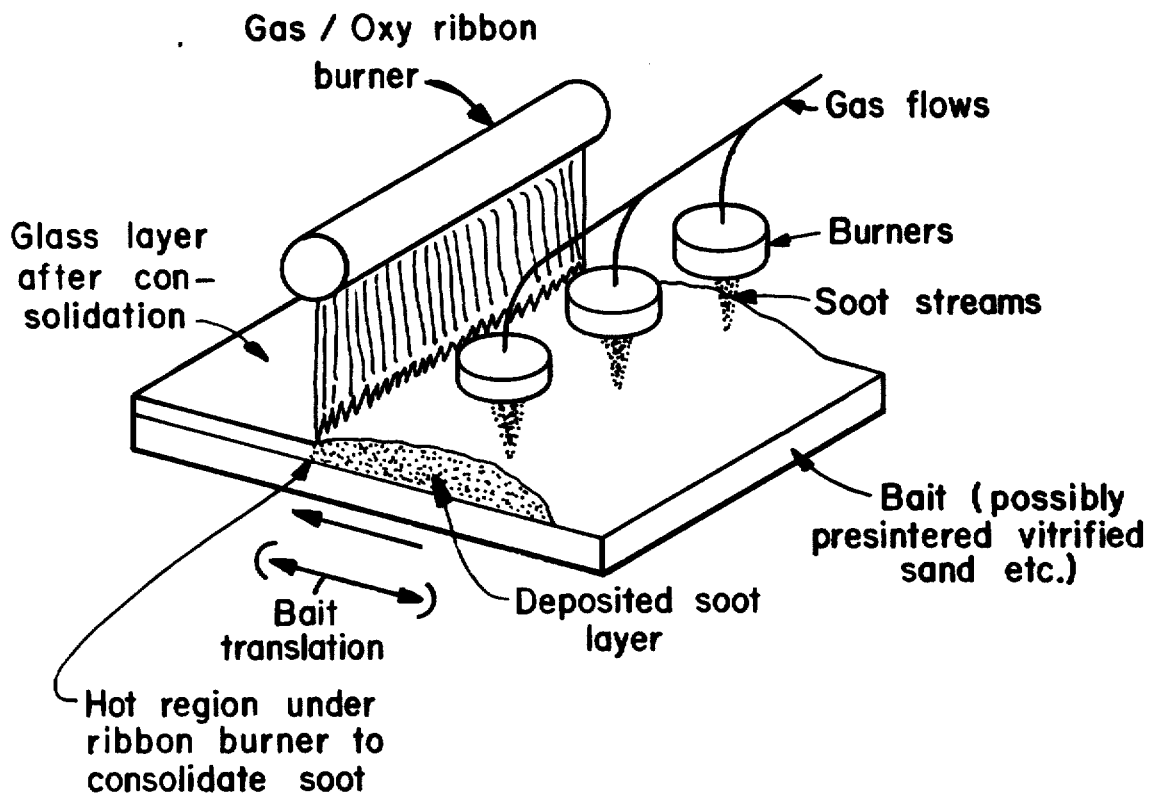
FIG. 3 represents schematically one apparatus useful in carrying out the inventive process.

FIG. 3 depicts schematically an apparatus illustrating one method by which the inventive process can be carried out. Thus, the apparatus consists of an array of burners for producing and directing high purity fused silica-containing soot downwardly onto a supporting bait or mandrel capable of being translated. If desired, a soot ribbon burner may be substituted for the array of single burners. A ribbon burner capable of directing heat uniformly across the deposited soot is placed in close proximity to the array of deposition burners, the heat generated by this burner being sufficient to consolidate the soot.

In operating the apparatus, a layer of fused silica-containing material is first deposited upon the translating bait by the array of deposition burners to produce a sheet-like layer of semisintered soot. Shortly thereafter, the soot is consolidated to an essentially non-porous glass utilizing the tracking ribbon burner. Repetition of that cycle builds up a glass boule, layer by layer, as is illustrated in FIG. 3.

The soot layer built up may have some undulations as deposited, but this phenomenon can be virtually eliminated by proper placement of the deposition burners, e.g., utilizing a double row of alternately-spaced burners, by using a soot ribbon burner, or by sideways as well as lateral translation of the bait. By keeping the soot deposition flame relatively low in temperature and employing an even, hot ribbon burner flame for consolidation, all of the deposited soot will be exposed to the same thermal gradient and, hence, refractive index/stress homogeneity is excellent. Schlieren stress rings are essentially totally absent. Moreover, because the soot consolidation flame is concentrated in a relatively thin area, rather than requiring the entire boule surface to be kept hot, the need for a refractory enclosure is removed and, consequently, inclusions due to refractory dust, grit, etc. are eliminated. If desired, the process can be carried out in a filtered clean room and the gas flows to the various burners can be filtered to prevent all extraneous contamination. Furthermore, the development of nodules is substantially absent since the soot consolidation flame delivers sufficient heat even to the edges of the boule for proper flow and consolidation.

Figure 4:
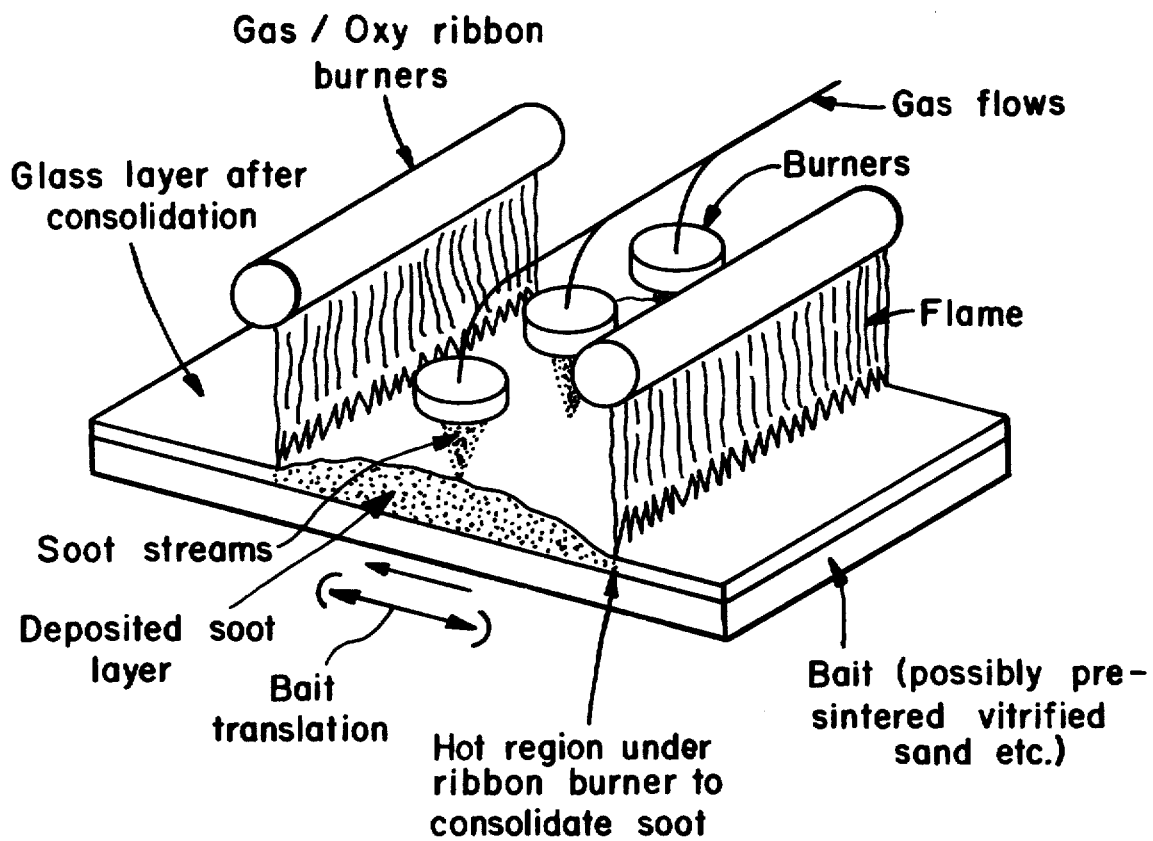
FIG. 4 represents schematically a modification of the apparatus of FIG. 3 providing for a more efficient inventive process.

FIG. 4 illustrates a modification of the apparatus set out in FIG. 3 which can promote more efficient deposition and consolidation of the soot. Thus, an array of soot deposition burners is placed between two consolidation ribbon burners. This practice can also minimize the presence of any undulations in the final consolidated layer.

The inventive method provides several significant advantages when compared with the prior art hot forming process. Hence, by eliminating the need for a refractory enclosure and minimizing the development of nodules, not only is a superior product produced but the overall costs of the process can be lower than those of the prior art hot forming. Also, inasmuch as the soot which does not fall upon the bait is not contaminated by a refractory environment, it can serve as a raw material in other processes, thereby further reducing overall process costs.

Figure 5:
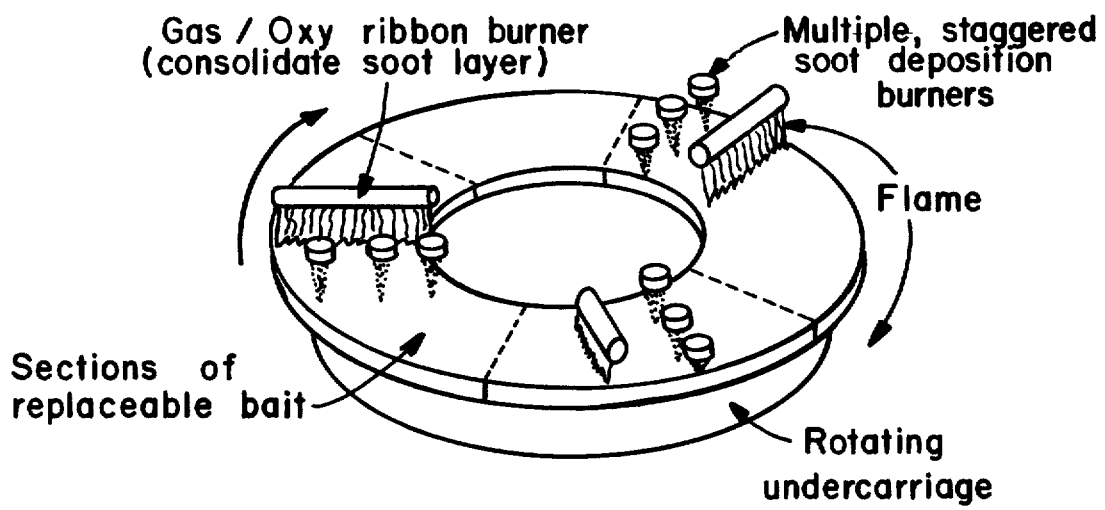
FIG. 5 is a schematic portrayal of an apparatus by which the inventive process can be made continuous.

FIG. represents schematically an apparatus by which the inventive method can be made continuous. Thus, FIG. 5 depicts a large diameter rotating bait table whereon glass is deposited in a strip near the outer circumference. This practice is followed to minimize temperature gradients along the diameter. This embodiment fo the method eliminates the heat and soot losses which are inherently experienced at the end of each cycle utilizing the translating bait apparatus described in FIG. 3. Hence, this embodiment further reduces process costs.

It must be appreciated, of course, that the apparatuses delineated in FIGS. 3, 4, and 5 are illustrative only and not limitative of the invention. Hence, the present invention is directed to a process—a process for preparing very high optical quality fused silica-containing materials. The process contemplates two basic operations: (1) a layer of semi-sintered silica-containing soot is deposited in the conventional manner; and (2) a heat source is directed to a limited area of the deposit, but uniformly across the breadth thereof, to consolidate the soot into a substantially nonporous glass. In essence, the second step can be likened to a zone sintering technique.

Whereas the soot will be deposited utilizing the customary burner practice, the flame depicted in FIGS. 3, 4, and 5 as the consolidation heat source simply provides a convenient, relatively-economical, readily-controllable means. Other means for providing heat concentrated uniformly over a relatively small area, such as, for example, electric radiant heaters, would be equally useful. However, the use of burners as is depicted in FIGS. 3, 4, and 5, constitutes a preferred type of apparatus for carrying out the inventive method.

It was observed above that the instant invention lends itself readily to the preparation of laminated articles wherein the laminae are composed of silica-containing materials. This capability has led to a specific utility for the inventive method.

Fused silica windows are used in the space shuttle-craft because of their high temperature character and their very low coefficient of thermal expansion. However, protection against deep abrasions, caused by contact with grit during landing and mechanical abuse during re-outfitting, has been sought which would improve the safety of the craft and remove the necessity for replacing the windows. In the past it has not been possible to enhance the strength of those polished fused silica windows while maintaining the required high optical properties, because conventional chemical strengthening by ion exchange and thermal tempering have proved impractical with this low expansion, single compound glass. The present invention furnishes a method for enhancing the mechanical strength of the fused silica windows without deleteriously affecting the optical properties thereof.

We have found that fused silica windows (and obviously, other fused silica articles) can be strengthened and the high optical quality maintained by applying a thin layer of $TiO_2$-$SiO_2$ glass on the surface thereof utilizing the method of the present invention. U.S. Pat. No. 2,326,059 discloses the preparation of those glasses via the flame hydrolysis technique and reference is made to that disclosure for such information. Those glasses exhibit coefficients of thermal expansion lower than that of fused silica such that, when the composite article is cooled from the annealing range, the surface layers prepared from such glasses will be put into compression. We have learned that a minimum of about 2% by weight $TiO_2$ is required to yield a glass having an expansion significantly lower than that of fused silica. The preferred compositions, however, contain about 7–9% $TiO_2$. A level of about 10% by weight $TiO_2$ constitutes the upper limit for stable glass formation in the $TiO_2$-$SiO_2$ system.

The apparatuses generally depicted in FIGS. 3 and 4 are especially suited for this purpose. Thus, the fused silica window becomes the bait which is placed upon a traverse table. The $TiO_2$-$SiO_2$ soot is deposited through the burners and consolidated via a ribbon burner tracking immediately therebehind. On each cycle, a very thin layer of $TiO_2$-$SiO_2$ soot was deposited which was consolidated to clear glass and integrally bonded to the fused silica by the closely following ribbon burner. A glass deposition rate of about 0.0018"/cycle was achieved. The glass layer was built up to the desired thickness (0.015"–0.03") by repeating the cycle as required. When utilizing Corning Code 7971 composition, a fused $SiO_2$-containing glass marketed commercially by Corning Glass Works, Corning, N.Y. consisting essentially, by weight of about 7.4% $TiO_2$ and 92.6% $SiO_2$, strength increments of 5000–6000 psi were imparted to fused silica articles. These values were obtained when the thickness ratio of the coating to the fused silica substrate approximated 0.04.

Not only does the application of the $TiO_2$-$SiO_2$ coating to the fused silica not adversely affect the optical properties demonstrated by the fused silica, but the coating may actually provide an improvement thereupon. Thus, a thin coating of $TiO_2$-$SiO_2$ glass may yield a composite body which is more resistant to solarization than the fused $SiO_2$ glass alone and, accordingly, not only is the laminated glass stronger than the fused $SiO_2$ glass, but is also of enhanced utility in spacecraft windows because it exhibits better optical properties after exposure to sunlight.

Whereas the above description of strengthening fused silica articles comprehends a very thin layer beng deposited upon the substrate, the inventive method also permits very thick, flat, clear layers to be obtained without peeling, curling, or cracking of the layer. Because of the difference in coefficient of thermal expansion existing between the two layers, some warpage of the composite may be observed where a very thick layer of the $TiO_2$-$SiO_2$ glass is deposited and consolidated. Such warpage can be prevented, however, if the fused silica material is maintained at a temperature above the strain point thereof during the deposition and consolidation.

Furthermore, the inventive process provides means for repairing the surfaces of optical quality fused silica-containing articles. Thus, a layer of fused silica can be deposited upon and consolidated over the substrate surface such as to become an integral part thereof. Also, for certain applications, such as reflective optics, a composite article may be satisfactory which consists of a fused silica-containing glass body portion or substrate which is not of high optical quality, and a relatively thin, integral surface layer of fused silica-containing glass of similar or different composition but which is of high optical quality. The present invention provides means for preparing such an article.

Finally, although the above description has referred specifically only to the deposition and consolidation of $SiO_2$ and $SiO_2$-$TiO_2$ bodies, other dopants known to the art, such as $Al_2O_3$, $B_2O_3$, $GeO_2$, and $P_2O_5$, are equally applicable to the inventive process. In general, a level of about 15% comprises the upper limit for stable glass formation with such dopants in combination with $SiO_2$.

We claim:

1. A method for preparing a fused silica-containing glass article of very high optical quality and having a large cross section or diameter, which comprises the steps of:
    (a) depositing via flame hydrolysis/oxidation reaction a layer of fused silica-containing soot upon a supporting bait;
    (b) essentially immediately thereafter applying a source of heat concentrated uniformly across the breadth of the soot deposit, but focused only over a relatively small area thereof, to raise the temperature thereof sufficiently to uniformly consolidate said small area of soot deposited into an essentially non-porous glass; and then
    (c) cooling said glass to room temperature.

2. A method according to claim 1 wherein said fused silica-containing glass is high purity fused silica.

3. A method according to claim 1 wherein said fused silica-containing glass includes $TiO_2$ and/or $Al_2O_3$ and/or $B_2O_3$ and/or $GeO_2$ and/or $P_2O_5$.

4. A method according to claim 3 wherein said fused silica-containing glass includes up to 10% $TiO_2$ and/or up to 15% $Al_2O_3$ and/or $B_2O_3$ and/or $GeO_2$ and/or $P_2O_5$.

5. A method for preparing a fused silica-containing glass article of very high optical quality and having a large cross section or diameter, which comprises the steps of:
    (a) depositing via flame hydrolysis/oxidation reaction a layer of fused silica-containing soot upon a supporting bait of fused silica-containing glass;
    (b) essentially immediately thereafter applying a source of heat concentrated uniformly across the breadth of the soot deposit, but focused only over a relatively small area thereof, to raise the temperature thereof sufficiently to uniformly consolidate said small area of soot deposit into an essentially non-porous glass and integrally bond said glass to said supporting bait glass; and then
    (c) cooling the body to room temperature.

6. A method according to claim 5 wherein said soot and said bait consist of high purity silica.

7. A method according to claim 6 wherein said bait is not of high optical quality.

8. A method according to claim 5 wherein the composition of said soot and said bait includes up to 15% total of the indicated oxides in the stated proportions of 0–10% $TiO_2$, 0–15% $Al_2O_3$, 0–15% $B_2O_3$, 0–15% $GeO_2$, and 0–15% $P_2O_5$.

9. A method according to claim 8 wherein said bait is not of high optical quality.

10. A method according to claim 5 wherein the composition of said bait consists of high purity silica and the composition of said soot includes up to 15% total of the indicated oxide in the stated proportion of 0–10% $TiO_2$, 0–15% $Al_2O_3$, 0–15% $B_2O_3$, 0–15% $GeO_2$, and 0–15% $P_2O_5$.

* * * * *